Sept. 1, 1925.
W. G. DUNN
1,551,813
AUTOMOBILE FENDER BRACE
Filed July 5, 1923
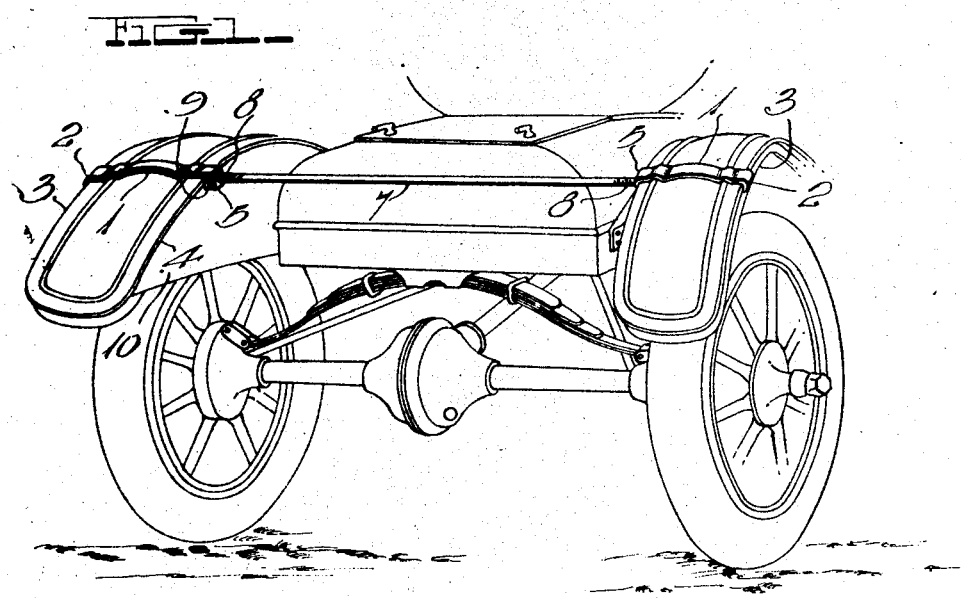
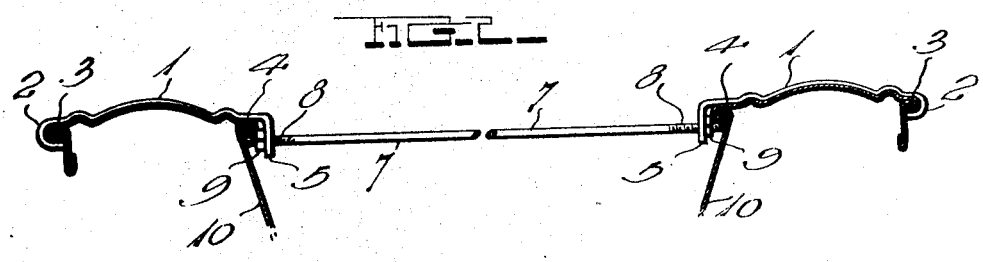
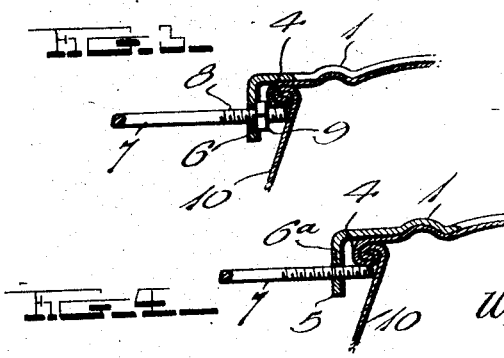
Inventor
William G. Dunn
Witness
H. Woodard
By H. B. Wilson & Co.
Attorneys Patented Sept. 1, 1925.

1,551,813

UNITED STATES PATENT OFFICE.

WILLIAM G. DUNN, OF CLARINDA, IOWA.

AUTOMOBILE FENDER BRACE.

Application filed July 5, 1923. Serial No. 649,644.

*To all whom it may concern:*

Be it known that I, WILLIAM G. DUNN, a citizen of the United States, residing at Clarinda, in the county of Page and State of Iowa, have invented certain new and useful Improvements in Automobile Fender Braces; and I do declare the following to be a full, clear, and exact description of the invention, such as will enable others skilled in the art to which it appertains to make and use the same.

My invention relates to improvements in fender braces of the type employed for transversely tying automobile fenders together and the object is to provide an extremely simple and inexpensive device of this character which may be quickly and easily applied, without forming any openings in or otherwise altering the fenders.

With the foregoing in view, the invention resides in the novel subject matter hereinafter described and claimed, the description being supplemented by the accompanying drawing.

Figure 1 is a perspective view of one of the fender braces applied to the rear fenders of an automobile.

Figure 2 is a side elevation of the brace with the fenders shown in transverse section.

Figure 3 is an enlarged detail sectional view similar to a portion of Fig. 2.

Figure 4 is a duplicate of Fig. 3 with the exception that it illustrates a slightly different form of construction.

In the form of construction shown in Figs. 1, 2 and 3 of the drawing, the numerals 1 designate a pair of gripping members in the form of metal straps shaped or arched upwardly between their ends to extend transversely across the upper surfaces of two opposed fenders, the outer ends of said straps being bent to form hooks 2 which engage the usual beads 3 at the outer edges or margins of the fenders. The inner ends of the straps 1 are downturned or bent at substantially right angles to extend across and beyond the beads 4 at the inner edges or margins of the fenders, forming ears or flanges 5, each of which is formed with a smooth-walled opening or aperture 6. A tie rod or connecting member 7 having oppositely threaded ends 8, extends between the two straps 1 and its ends pass through the openings 6, nuts 9 being threaded upon said ends to contact with the outer sides of the ears 5 and establish threaded connections between the rod and the straps 1. By loosening the nuts 9 to a sufficient extent, the inner ends of the straps 1 may be properly positioned upon the fenders after engaging the hooks 2 with the beads 3 and by then tightening the nuts with a wrench or holding these nuts against turning and turning the rod 7 with a pair of pliers or the like, the extremities of the rod will be projected beyond the nuts to bind tightly under the beads 4 and abut or be in forcible contact with the inner side walls, or skirts or downwardly extending portions 10 of the fenders. Thus, the two straps are tightly clamped upon the fenders and at the same time, the latter are drawn snugly toward each other and held against vibration and rattling.

Instead of employing the threaded connection above described between the straps 1 and the rod 7, the construction shown in Fig. 4 may be used, in which construction, the ear 5 is formed with a threaded opening $6^a$ through which the threaded end of the rod passes.

Either form of construction is simple and inexpensive, yet constitutes a very desirable article, whether used on the front or the rear fenders and with the exception of slight variations in size, the front and rear braces are duplicates. Excellent results have been obtained from the details disclosed, and these details are therefore preferably followed, but within the scope of the invention as claimed, numerous minor changes may be made.

I claim:

1. A fender brace comprising a pair of straps adapted to extend transversely across two fenders at opposite sides of an automobile, the outer ends of said straps having hooks at one side of said straps to engage the outer edges of the fenders, while the inner ends of said straps are provided with apertured ears at the same side of the straps as said hooks to extend across the usual beads at the inner edges of the fenders, and a tie rod having its ends passed through the apertures of said ears, said rod ends having threaded connections with said straps to cause tightening of such connections to project said rod ends under the above mentioned beads of the fenders to bind the brace in place.

2. A fender brace comprising a pair of straps adapted to extend transversely across two fenders at opposite sides of an automobile, the outer ends of said straps having hooks at one side of said straps to engage the outer edges of the fenders, while the inner ends of said straps are provided with apertured ears at the same side of the straps as said hooks to extend across the usual beads at the inner edges of the fenders, and a tie rod threaded oppositely through said ears, whereby rotation of said rod will cause projection of its ends beyond the ears to bind under the above mentioned fender beads and secure the brace in place.

3. The combination with a vehicle fender of a gripping member extending transversely thereof, said member being formed at its outer end with a hook engaging a margin of said fender and at its inner end projecting beyond the inner margin of the fender and formed with a downturned apertured flange, and being arched upwardly between its ends, and a connecting member extending through the aperture of said flange into engagement with said fender.

4. A fender brace comprising two members adapted to be mounted respectively across the upper surfaces of opposed fenders, each of said members being formed at one end with a hook adapted to engage a margin of a fender and at its opposite end with an apertured flange, and a rod connecting said members and extending through the apertures of said flanges, said rod engaging at its ends between a downwardly extending portion and an inner marginal portion of the fenders and being in forcible contact with each of said fender portions, together with means for securing said rod.

In testimony whereof I have hereunto affixed my signature.

WILLIAM G. DUNN.